United States Patent [19]

Evertz et al.

[11] Patent Number: 5,527,868

[45] Date of Patent: Jun. 18, 1996

[54] CATALYST SYSTEMS FOR THE POLYMERIZATION OF $C_2$-$C_{10}$-ALK-1-ENES

[75] Inventors: Kaspar Evertz, Schifferstadt; Rueger Schlund, Mannheim; Peter Jutzi, Bielefeld; Ingrid Mieling, Ochtrup, all of Germany

[73] Assignee: BASF Aktiengesellschaft, Ludwigshafen, Germany

[21] Appl. No.: 343,561

[22] PCT Filed: May 27, 1993

[86] PCT No.: PCT/EP93/01329

§ 371 Date: Nov. 22, 1994

§ 102(e) Date: Nov. 22, 1994

[87] PCT Pub. No.: WO93/24536

PCT Pub. Date: Dec. 9, 1993

[30] Foreign Application Priority Data

Jun. 3, 1992 [DE] Germany .......................... 42 18 201.8

[51] Int. Cl.[6] .................. C08F 4/44; C08F 4/02; B01J 31/00
[52] U.S. Cl. .................. 526/160; 526/127; 526/150; 502/102; 502/103; 502/114; 502/117
[58] Field of Search ................... 502/117, 103, 502/102, 114; 526/129, 160

[56] References Cited

U.S. PATENT DOCUMENTS 5,329,033 7/1994 Spalech et al. ............... 502/117

FOREIGN PATENT DOCUMENTS 69951 4/1987 European Pat. Off. .

OTHER PUBLICATIONS

Makromol. Chem., Macromol. Symp 48/49 (1991) 253–295, Ewen et al.
J. Organometal. Chem. 369 (1989), 359–370—Wiesenfeldt et al.

*Primary Examiner*—Sharon Gibson
*Attorney, Agent, or Firm*—Keil & Weinkauf

[57] ABSTRACT

Catalyst systems for the polymerization of $C_2$-$C_{10}$-alk-1-enes contain, as active components, a) a metallocene complex of the general formula I

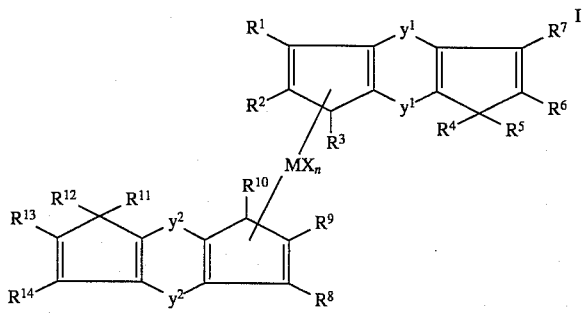

where M is a metal of subgroup III, IV or V of the Periodic Table of Elements or a metal of the lanthanide group, X is halogen, hydrogen, $C_1$-$C_{10}$-alkyl, $C_3$-$C_{10}$-cycloalkyl, $C_6$-$C_{15}$-aryl, alkylaryl of 7 to 15 carbon atoms or —$OR^{15}$, $R^{15}$ is $C_1$-$C_{10}$-alkyl, $C_6$-$C_{15}$-aryl, alkylaryl, arylalkyl, fluoroalkyl or fluoroaryl, each having 1 to 10 carbon atoms in the alkyl radical and 6 to 20 carbon atoms in the aryl radical, n is the valency of M minus two, $R^1$ to $R^{14}$ are each hydrogen or $C_1$-$C_{10}$-alkyl or are each $C_3$-$C_{10}$-cycloalkyl which in turn may carry $C_1$-$C_{10}$-alkyl as substituent, or are each $C_6$-$C_{15}$-aryl or arylalkyl, where two adjacent radicals together may furthermore form a cyclic group of 4 to 15 carbon atoms, or are each $Si(R^{16})_3$, $R^{16}$ is $C_1$-$C_{10}$-alkyl, $C_6$-$C_{15}$-aryl or $C_3$-$C_{10}$-cycloalkyl;

$y^1$, $y^2$ are each $CH_2$, $C(R^{17})_2$, $Si(R^{17})_2$, $Ge(R^{17})_2$ or $Sn(R^{17})_2$, $R^{17}$ is $C_1$-$C_{10}$-alkyl, $C_6$-$C_{15}$-aryl, $C_3$-$C_{10}$-cycloalkyl, alkylaryl or $Si(R^{18})_3$ and $R^{18}$ is $C_1$-$C_{10}$-alkyl, $C_6$-$C_{15}$-aryl, $C_3$-$C_{10}$-cycloalkyl or alkylaryl, and b) an open-chain or cyclic alumoxane compound of the general formula II or III

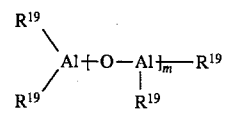

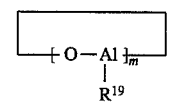

where $R^{19}$ is $C_1$-$C_4$-alkyl and m is an integer from 5 to 30.

5 Claims, No Drawings

CATALYST SYSTEMS FOR THE POLYMERIZATION OF $C_2$–$C_{10}$-ALK-1-ENES

The present invention relates to catalyst systems for the polymerization of $C_2$–$C_{10}$-alk-1-enes, containing, as active components, a) a metallocene complex of the general formula I

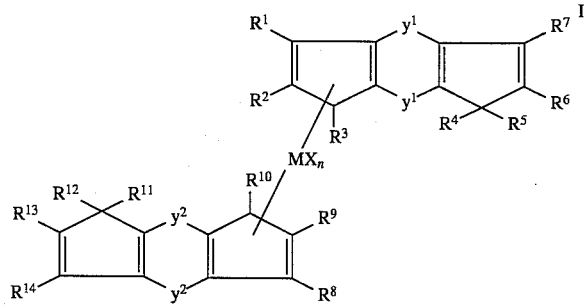

where

M is a metal of subgroup III, IV or V of the Periodic Table of Elements or a metal of the lanthanide group, X is halogen, hydrogen, $C_1$–$C_{10}$-alkyl, $C_3$–$C_{10}$-cycloalkyl, $C_6$–$C_{15}$-aryl, alkylaryl of 7 to 15 carbon atoms or —$OR^{15}$, $R^{15}$ is $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical, n is the valency of M minus two, $R^1$ to $R^{14}$ are each hydrogen or $C_1$–$C_{10}$-alkyl or are each $C_3$–$C_{10}$-cycloalkyl which in turn may carry $C_1$–$C_{10}$-alkyl as substituent, or are each $C_6$–$C_{15}$-aryl or arylalkyl, where two adjacent radicals together may furthermore form a cyclic group of 4 to 15 carbon atoms, or are each $Si(R^{16})_3$, $R^{16}$ is $C_1$–$C_{10}$-alkyl, $C_6$–$C_{15}$-aryl or $C_3$–$C_{10}$-cycloalkyl, $y^1$, $y^2$ are each $CH_2$, $C(R^{17})_2$, $Si(R^{17})_2$, $Ge(R^{17})_2$ or $Sn(R^{17})_2$, $R^{17}$ is $C_1$–$C_{10}$-alkyl, $C_6$–$C_{15}$-aryl, $C_3$–$C_{10}$-cycloalkyl, alkylaryl or $Si(R^{18})_3$ and $R^{18}$ is $C_1$–$C_{10}$-alkyl, $C_6$–$C_{15}$-aryl, $C_3$–$C_{10}$-cycloalkyl or alkylaryl, and b) an open-chain or cyclic alumoxane compound of the general formula II or III

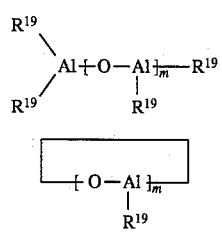

where $R^{19}$ is $C_1$–$C_4$-alkyl and m is an integer from 5 to 30.

The invention furthermore relates to the use of such catalyst systems for the preparation of polyalk-1-enes, processes for the preparation of polyalk-1-enes with the aid of these catalyst systems and the polyalk-1-enes obtainable thereby.

The patent literature, for example EP-A 69 951, describes many examples of unbridged, achiral metallocene complexes in conjunction with alumoxanes as catalysts for the polymerization of olefins. Stereoselective polymerizations are not possible with these systems. Furthermore, the introduction of chiral substituents in the cyclopentadienyl ring does not induce stereoselectivity in the polymerization of alk-1-enes with alumoxane as cocatalyst.

Makromol. Chem., Macromol. Symp. 48/49 (1991), 253–295 discloses that metallocene complexes which have a bridge between the cyclopentadienyl rings are suitable for stereospecific polymerizations of alk-1-enes. However, the synthesis of such compounds is expensive.

It is an object of the present invention to provide novel catalyst systems which are suitable for the uniform homopolymerization and in particular copolymerization of alkenes, give polymers having narrow molecular weight and comonomer distributions and are capable of stereoselectively polymerizing prochiral olefins.

We have found that this object is achieved by the catalyst systems defined at the outset and intended for the preparation of polyalk-1-enes. We have also found the use of such catalyst systems for the preparation of polyalk-1-enes, processes for the preparation of polyalk-1-enes with the aid of these catalyst systems and the polyalk-1-enes obtainable thereby.

The active components contained in the novel catalyst systems include one or more complexes of the general formula I:

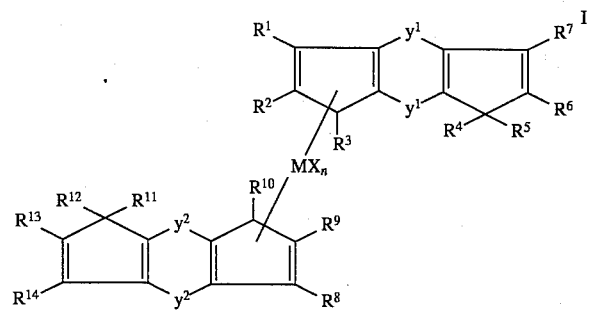

M is a metal of subgroup III, IV or V of the Periodic Table of Elements or a metal of the lanthanide group, preferably a metal of subgroup IV or V, in particular titanium, zirconium or hafnium.

X is halogen, preferably chlorine, hydrogen, $C_1$–$C_{10}$-alkyl, preferably linear alkyl of 1 to 4 carbon atoms, in particular methyl or ethyl, $C_3$–$C_{10}$-cycloalkyl, preferably $C_5$- or $C_6$-cycloalkyl, $C_6$–$C_{15}$-aryl, preferably phenyl, alkylaryl of 7 to 15 carbon atom, preferably benzyl, or a group —$OR^{15}$, where $R^{15}$ is $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical.

$R^1$ to $R^{14}$, independently of one another, are each preferably hydrogen, $C_1$–$C_{10}$-alkyl, preferably $C_1$–$C_4$-alkyl, $C_3$–$C_{10}$-cycloalkyl, preferably $C_5$- or $C_6$-cycloalkyl, which in turn may carry $C_1$–$C_{10}$-alkyl as a substituent, $C_6$–$C_{15}$-aryl, preferably phenyl, or arylalkyl, preferably benzyl. It is also possible for two adjacent radicals, ie. $R^1$ and $R^2$, $R^2$ and $R^3$, $R^5$ and $R^6$ or $R^6$ and $R^7$ and $R^8$ and $R^9$, $R^9$ and $R^{10}$, $R^{12}$ and $R^{13}$ or $R^{13}$ and $R^{14}$, together to form a cyclic group of 4 to 15 carbon atoms, which may furthermore be aromatic; two adjacent radicals preferably form a 6-membered ring.

$R^1$ to $R^{14}$ may furthermore be $Si(R^{16})_3$, where $R^{16}$ is $C_1$–$C_{10}$-alkyl, $C_6$–$C_{15}$-aryl or $C_3$–$C_{10}$-cycloalkyl.

Particularly suitable compounds of the general formula I are those in which $R^1$ to $R^{14}$ are chosen so that symmetrical compounds are formed, ie., for example, $R^1$ and $R^8$ are identical, as are $R^2$ and $R^9$, $R^3$ and $R^{10}$, $R^4$ and $R^{11}$, $R^5$ and $R^{12}$, $R^6$ and $R^{13}$ and $R^7$ and $R^{14}$. Particularly preferred compounds of the general formula I are those in which all radicals $R^1$ to $R^{14}$ are hydrogen.

$y^1$ and $y^2$ may be identical or different and are each $CH_2$, $C(R^{17})_2$, $Si(R^{17})_2$, $Ge(R^{17})_2$ or $Sn(R^{17})_2$, $Si(R^{17})_2$ being preferred. $R^{17}$ is $C_1$–$C_{10}$-alkyl, preferably $C_1$–$C_4$-alkyl, in particular methyl, $C_6$–$C_{15}$-aryl, preferably phenyl, $C_3$–$C_{10}$-cycloalkyl, preferably $C_5$–$C_6$-cycloalkyl, alkylaryl, preferably benzyl, or $Si(R^{18})_3$, where $R^{18}$ is $C_1$–$C_{10}$-alkyl, $C_6$–$C_{15}$-aryl or $C_3$–$C_{10}$-cycloalkyl or alkylaryl.

Such complexes can be synthesized by conventional methods, the reaction of the corresponding ligands with, for example, butyl-lithium and subsequent addition of $MX_{n+2}$ being preferred.

Examples of corresponding preparation processes are described in, inter alia, J. Organometal. Chem. 369 (1989), 359–370.

The metallocene complexes may also be present in cationic form, as described in EP-A 277 003 and EP-A 277 004.

In addition to the metallocene complexes, the novel catalyst systems also contain oligomeric alumoxane compounds.

For example, open-chain or cyclic alumoxane compounds of the general formula II or III

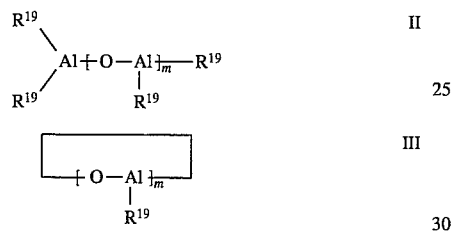

where $R^{19}$ is $C_1$–$C_4$-alkyl, preferably methyl or ethyl, and m is an integer from 5 to 30, preferably from 10 to 25, are suitable.

The preparation of these oligomeric alumoxane compounds is usually carried out by reacting a solution of a trialkylaluminum with water and is described in, inter alia, EP-A 284 708 and U.S. Pat. No. 4,794,096.

As a rule, the oligomeric alumoxane compounds obtained are in the form of mixtures of both linear and cyclic chain molecules of different lengths, so that m is to be regarded as an average value. The alumoxane compounds may also be present as a mixture with other metal alkyls, preferably with alkylaluminums.

It has proven advantageous if the atomic ratio of aluminum from the oligomeric alumoxane compound to the metal M from the metallocene complex is from 10:1 to $10^6$:1, preferably from 10:1 to $10^4$:1.

The components of the novel catalyst systems may be introduced into the polymerization reactor individually in any sequence or as a mixture.

With the aid of these catalyst systems, it is possible to prepare polymers of alk-1-enes. These are understood as being homo- and copolymers of $C_2$–$C_{10}$-alk-1-enes, preferably used monomers being ethylene, propylene, but-1-ene, pent-1-ene and hex-1-ene.

The preparation of these polymers may be carried out either batchwise or, preferably, continuously in the conventional reactors used for the polymerization of alkenes. Suitable reactors include continuously operated stirred kettles, and it is also possible to use a plurality of stirred kettles connected in series.

In a preferred embodiment, the oligomeric alumoxane compound, preferably in the form of a solution in an inert solvent, for example in benzene, toluene, hexane, heptane or a mixture thereof, is initially taken and is heated to 20°–80° C. The metallocene complex, which is preferably in solution in an inert solvent, in particular in the solvent in which the oligomeric alumoxane compound is also dissolved, is then added.

The polymerization conditions are in principle not critical; pressures of from 0.5 to 3000, preferably from 1 to 80, bar and temperatures of from −50° to +300° C., preferably from −20° to 100° C., have proven suitable.

Polymerization reactions with the aid of the novel catalyst systems can be carried out in the gas phase, in suspension, in liquid monomers or in inert solvents. In the polymerization in solvents, in particular liquid hydrocarbons, such as benzene or toluene, are used. Polymers having good performance characteristics are also obtainable in the polymerization in the gas phase, in suspension and in liquid monomers.

The average molecular weight of the polymers formed can be controlled by the methods usually used in polymerization technology, for example by adding regulators such as hydrogen, or by changing the reaction temperatures.

The novel catalyst systems have very high productivity.

EXAMPLES

Example 1

Preparation of a titanium complex of the formula Ia

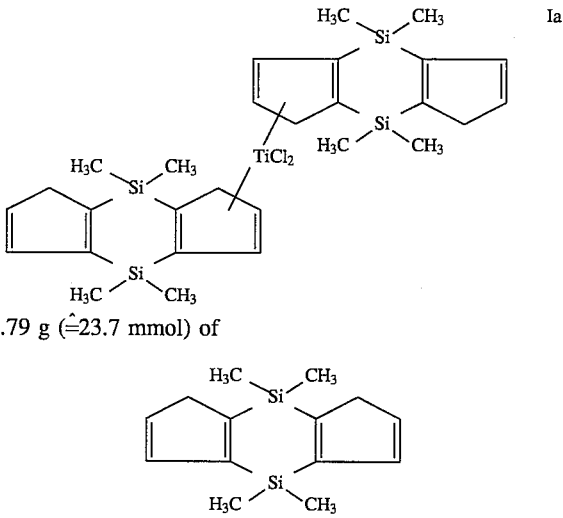

5.79 g ($\hat{=}$23.7 mmol) of were dissolved in 150 ml of toluene, and 15.0 ml of a 1.58 molar solution of n-butyllithium in hexane ($\hat{=}$23.7 mmol) were added at room temperature. For complete conversion, stirring was carried out for 12 hours. Thereafter, the white suspension prepared was slowly added dropwise at −100° C. to a solution of 2.25 g ($\hat{=}$11.9 mmol) of $TiCl_4$ in 150 ml of toluene, and the mixture was allowed to warm up to room temperature. The bright red solution obtained was filtered off from the undissolved matter, the residue was washed with hexane (2×20 ml) and the solvent was completely removed under greatly reduced pressure. The residue was taken up with 100 ml of hexane and crystallized at −30° C. The bright red needles were isolated and were dried under greatly reduced pressure.

Yield: 3.30 g ($\hat{=}$46%)

Melting point: 152° C.

The substance was stable in air and readily soluble in organic solvents.

Analytical data for the compound Ia:

$^1$H-NMR ($CDCl_3$): δ=−0.69, 0.38, 0.40, 0.53 (4s, 4x6H, 4x$CH_3$), 4.85 (br. s, 2H, 2xallyl. H), 6.31 (br. s, 2H, H-5, H-5'), 6.76 (m, 2H, H-11, H-11'), 6.91 (m, 2H, H-12, H-12'), 6.97 (br. s, 4H, H-4, H-6, H-4', H-6'), 7.07 (br. s, 2H, H-10, H-10').

$^{13}C\{^1H\}$-NMR (CDCl$_3$): δ=−5.58, −1.02, 1.26 (br.; 4xCH$_3$), 55.94 (allyl. C), 114.86 (vinyl. CH), 131.68 (C-5, C-5'), 133.82 (C-4, C-6, C-4', C-6'), 139.45, 140.09 (vinyl. CH), 142.04 (br., C-3, C-7, C-3', C-7') 144.10 (vinyl. C).

$^{29}Si$-NMR (CDCl$_3$): δ=−1.73, −17.47.

MS: m/z (rel. Int. [%])=605 (M$^+$, 45), 570 ((M-$^{35}$Cl),26), 361 ((M-(1),100), 326 ((M-(1)-$^{35}$Cl),62), 290 ((M-(1)-2x$^{35}$Cl),50), 274 ((M-(1)-2x$^{35}$Cl-CH$_3$),12), 244 ((M-(1)-2x$^{35}$Cl-$^{48}$Ti),22).

C$_{28}$H$_{38}$Cl$_2$Si$_4$Ti (605.1) Calculated C 55.52 H 6.28 Found C 54.26 H 6.54

Examples 2 to 5

Preparation of polyethylene (PE) with Ia 450 ml of toluene were initially taken in a 1 l steel autoclave and heated to various temperatures, and 6.15 ml (=10.26 mmol) of a 1.6 molar solution of methyl alumoxane (MAO) in toluene were added. 6.16 mg (=0.0102 mmol of Ti) of Ia in the form of a solution in toluene (1 mg/ml) were then added. The atomic ratio of Al from MAO to Ti from Ia was 1000:1. The autoclave was then purged with ethylene under various pressures. After a polymerization time of 60 minutes, the pressure was let down and the PE formed was freed from adhering solvent by expelling the toluene with steam and was dried.xs.

The experimental conditions and the properties of the polyethylenes formed are listed in the table.

The Staudinger index [η] was determined at 135° C. in decalin.

TABLE

| Example | Temperature [°C.] | pressure [bar] | Yield [g of PE] | [g of PE/g of Ia] | [η] [cm$^3$/g] |
| --- | --- | --- | --- | --- | --- |
| 2 | 30 | 9 | 1.8 | 290 | 520 |
| 3 | 50 | 9 | 5.9 | 960 | 740 |
| 4 | 80 | 9 | 0.7 | 113 | 230 |
| 5 | 50 | 18 | 7.5 | 1220 | 1110 |

We claim:

1. A catalyst system for the polymerization of C$_2$–C$_{10}$-alk-1-enes, containing, as active components,
a) a metallocene complex of the formula I

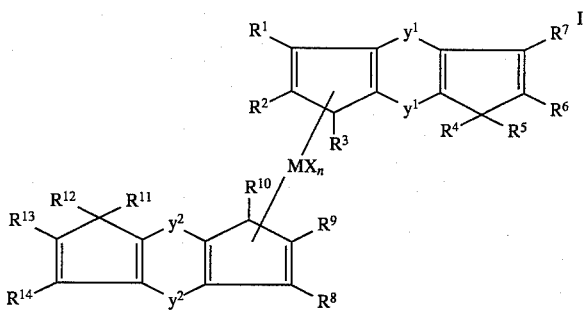

where

M is a metal of subgroup III, IV or V of the Periodic Table of Elements or a metal of the lanthanide group, X is halogen, hydrogen, C$_1$–C$_{10}$-alkyl, C$_3$–C$_{10}$-cycloalkyl, C$_6$–C$_{15}$-aryl, alkylaryl of 7 to 15 carbon atoms or —OR$^{15}$, R$^{15}$ is C$_1$–C$_{10}$-alkyl, C$_6$–C$_{15}$-aryl, alkylaryl, arylalkyl, fluoroalkyl or fluoroaryl, each having 1 to 10 carbon atoms in the alkyl radical and 6 to 20 carbon atoms in the aryl radical, n is the valency of M minus two, R$^1$ to R$^{14}$ are each hydrogen or C$_1$–C$_{10}$-alkyl or are each C$_3$–C$_{10}$-cycloalkyl optionally substitued by C$_1$–C$_{10}$-alkyl, or are each C$_6$–C$_{15}$-aryl or arylalkyl, where two adjacent radicals together may furthermore form a cyclic group of 4 to 15 carbon atoms, or are each Si(R$^{16}$)$_3$, R$^{16}$ is C$_1$–C$_{10}$-alkyl, C$_6$–C$_{15}$-aryl or C$_3$–C$_{10}$-cycloalkyl, y$^1$, y$^2$ are each CH$_2$, C(R$^{17}$)$_2$, Si(R$^{17}$)$_2$, Ge(R$^{17}$)$_2$ or Sn(R$^{17}$)$_2$, R$^{17}$ is C$_1$–C$_{10}$-alkyl, C$_6$–C$_{15}$-aryl, C$_3$–C$_{10}$-cycloalkyl, alkylaryl or Si(R$^{18}$)$_3$ and R$^{18}$ is C$_1$–C$_{10}$-alkyl, C$_6$–C$_{15}$-aryl, C$_3$–C$_{10}$-cycloalkyl or alkylaryl, and b) an open-chain or cyclic alumoxane compound of the formula II or III

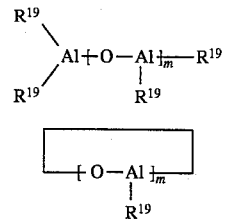

where R$^{19}$ is C$_1$–C$_4$-alkyl and m is an integer from 5 to 30.

2. The catalyst system of claim 1, wherein M is a metal of subgroup IV of the Periodic Table of Elements.

3. The catalyst system of claim 1, wherein y$^1$ and y$^2$ are each Si(R$^{17}$)$_2$.

4. A polymer of C$_2$–C$_{10}$-alk-1-enes, obtained by a process as defined in claim 1.

5. A process for the preparation of polymers of C$_2$–C$_{10}$-alk-1-enes which comprises polymerizing a C$_2$–C$_{10}$-alk-1-ene at from 0.5 to 3000 bar, and at from −50° to 300° C. in the presence of the catalyst system of claim 1.

* * * * *

UNITED STATES PATENT AND TRADEMARK OFFICE
CERTIFICATE OF CORRECTION

PATENT NO.: 5,527,868

DATED: June 18, 1996

INVENTOR(S): EVERTZ et al.

It is certified that error appears in the above-identified patent and that said Letters Patent is hereby corrected as shown below:

Column 6, claim 5, line 56, "C." should read --C--.

Signed and Sealed this

Twenty-ninth Day of October 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,527,868
DATED : June 18, 1996
INVENTOR(S) : EVERTZ et al.

It is certified that error appears in the above-indentified patent and that said Letters Patent is hereby corrected as shown below:

Column 6, claim 4 should be renumbered claim 5 and the dependency corrected to read as follows:

--5. A polymer of $C_2$-$C_{10}$-alk-1-enes, obtained by a process as defined in claim 4.--

Column 6, claim 5 should be renumbered as claim 4.

Signed and Sealed this

Fourth Day of March, 1997

Attest:

BRUCE LEHMAN

Attesting Officer

Commissioner of Patents and Trademarks